(12) United States Patent
Senoo

(10) Patent No.: US 8,276,434 B2
(45) Date of Patent: Oct. 2, 2012

(54) MOBILE DEVICE, STEP COUNTING METHOD, AND GRAVITY DIRECTION DETECTING METHOD

(75) Inventor: Yoshinori Senoo, Osaka (JP)

(73) Assignee: KYOCERA Corporation, Kyoto (JP)

( * ) Notice: Subject to any disclaimer, the term of this patent is extended or adjusted under 35 U.S.C. 154(b) by 478 days.

(21) Appl. No.: 12/509,956

(22) Filed: Jul. 27, 2009

(65) Prior Publication Data

US 2010/0024531 A1  Feb. 4, 2010

(30) Foreign Application Priority Data

Jul. 29, 2008 (JP) ................................. 2008-194975

(51) Int. Cl.
*G01M 1/00* (2006.01)
(52) U.S. Cl. ...................................... 73/65.01
(58) Field of Classification Search ................. 73/65.01
See application file for complete search history.

(56) References Cited

U.S. PATENT DOCUMENTS

| | | | |
|---|---|---|---|
| 6,546,336 B1 * | 4/2003 | Matsuoka et al. | 701/213 |
| 7,194,816 B2 * | 3/2007 | Tamura | 33/355 R |
| 7,684,958 B2 * | 3/2010 | Ohta et al. | 702/160 |
| 7,877,224 B2 * | 1/2011 | Ohta | 702/152 |
| 7,966,146 B2 * | 6/2011 | Shkolnikov | 702/141 |
| 2007/0198187 A1 | 8/2007 | Pasolini et al. | |
| 2008/0190201 A1 | 8/2008 | Makino | |

FOREIGN PATENT DOCUMENTS

| | | |
|---|---|---|
| JP | 2005-157465 | 6/2005 |
| JP | 2007-115242 A | 5/2007 |
| JP | 2007-226371 | 9/2007 |
| JP | 2007-226779 | 9/2007 |
| WO | 2006/008790 A | 1/2006 |

OTHER PUBLICATIONS

Notice of Ground of Rejection issued in corresponding Japanese Patent Application No. 2008-194975 dated Jul. 6, 2010.
Notice of Ground for Rejection dated Mar. 13, 2012, issued in counterpart Japanese Application No. 2010-197363.

* cited by examiner

*Primary Examiner* — Lisa Caputo
*Assistant Examiner* — Octavia Davis-Hollington
(74) *Attorney, Agent, or Firm* — Procopio, Cory, Hargreaves & Savitch LLP

(57) ABSTRACT

In order to count the number of steps without involving an increase in circuit size or in computational load, a mobile phone includes a three-axis acceleration sensor to detect accelerations in three directions of X axis, Y axis, and Z axis, which are different from each other, a gravity direction detecting portion to detect a gravity direction on the basis of the detected accelerations in the three directions, a gravity direction acceleration calculating portion to calculate an acceleration in the detected gravity direction on the basis of the detected accelerations in the three directions, and a step counting portion to count the number of steps on the basis of the calculated gravity direction acceleration.

14 Claims, 10 Drawing Sheets

F I G. 1
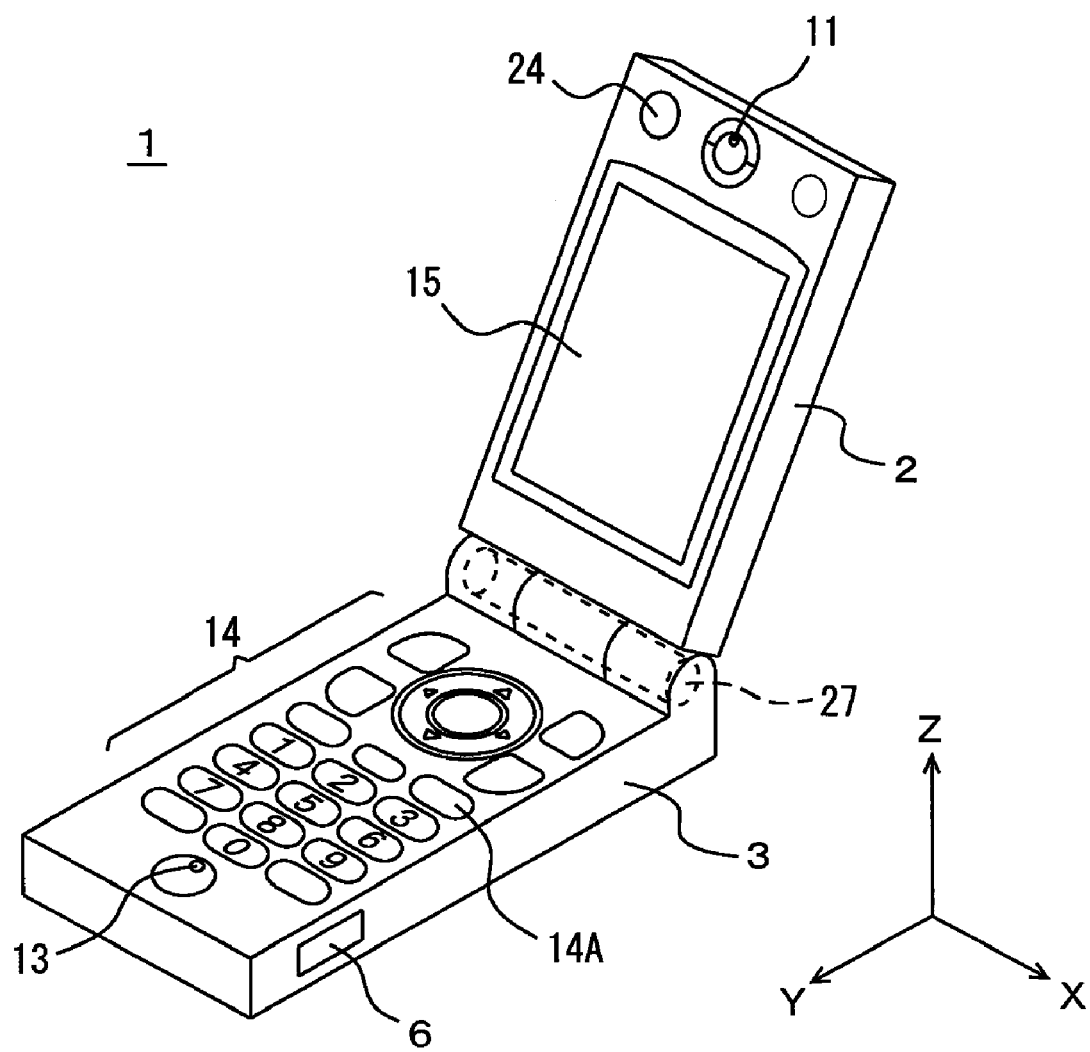

FIG. 4

| No. | AXIS | SCALAR | DIRECTION | | |
|---|---|---|---|---|---|
| | | | X AXIS | Y AXIS | Z AXIS |
| 1 | X | $\sqrt{X^2}$ | + | N | N |
| 2 | | | − | N | N |
| 3 | Y | $\sqrt{Y^2}$ | N | + | N |
| 4 | | | N | − | N |
| 5 | Z | $\sqrt{Z^2}$ | N | N | + |
| 6 | | | N | N | − |
| 7 | XY | $\sqrt{X^2+Y^2}$ | + | + | N |
| 8 | | | + | − | N |
| 9 | | | − | + | N |
| 10 | | | − | − | N |
| 11 | XZ | $\sqrt{X^2+Z^2}$ | + | N | + |
| 12 | | | + | N | − |
| 13 | | | − | N | + |
| 14 | | | − | N | − |
| 15 | YZ | $\sqrt{Y^2+Z^2}$ | N | + | + |
| 16 | | | N | + | − |
| 17 | | | N | − | + |
| 18 | | | N | − | − |
| 19 | XYZ | $\sqrt{X^2+Y^2+Z^2}$ | + | + | + |
| 20 | | | + | + | − |
| 21 | | | + | − | + |
| 22 | | | + | − | − |
| 23 | | | − | + | + |
| 24 | | | − | + | − |
| 25 | | | − | − | + |
| 26 | | | − | − | − |

MOBILE DEVICE, STEP COUNTING METHOD, AND GRAVITY DIRECTION DETECTING METHOD

CROSS REFERENCE TO RELATED APPLICATION

This application is based on Japanese Patent Application No. 2008-194975 filed with Japan Patent Office on Jul. 29, 2008, the entire content of which is hereby incorporated by reference.

FIELD OF THE INVENTION

The present invention relates to a mobile device, a step counting method, and a gravity direction detecting method. More particularly, the present invention relates to a mobile device which includes a three-axis acceleration sensor and a step counting method and a gravity direction detecting method which are performed by the mobile device.

BACKGROUND

Recently, there is a mobile phone on which a three-axis acceleration sensor is mounted for counting the number of steps on foot. For example, Japanese Patent Laid-Open No. 2005-157465 discloses a technique of counting the number of steps from an acceleration resulting from a combination of fluctuation components which are obtained by excluding gravity components from values output from an acceleration sensor. With this technique of counting the number of steps, however, the number of steps is counted from the acceleration obtained by combining the fluctuation components from which the gravity components are excluded, and thus, the direction of gravity (gravity direction) is not detected. This means that if a horizontal acceleration is generated, the number of steps cannot be counted. Furthermore, as a mobile phone is generally provided with the vibration function for notifying the user of an incoming call or the like by a vibrating alert, the acceleration which is generated by the vibration function while the vibration function is working may be detected by the acceleration sensor, hindering counting of the number of steps while the vibration function is working.

The walking cycle of a person, with a frequency of 2 to 4 Hz, is lower than the cycle of the vibration function. Thus, it may be conceivable to apply Fourier transform to the values output from the acceleration sensor so as to exclude the acceleration that is generated while the vibration function is working. The Fourier transform, however, requires considerable computational effort, which causes the need of speeding up the arithmetic unit, leading to an increased cost. While it may also be conceivable to detect the vibration with the frequencies of 2 to 4 Hz, a low-pass filter circuit will have to be provided, leading to an increased cost as well as an increased device size.

SUMMARY OF THE INVENTION

The present invention has been accomplished in view of the foregoing problems, and an object of the present invention is to provide a mobile device and a step counting method capable of counting the number of steps without involving an increase in circuit size or in computational load.

Another object of the present invention is to provide a mobile device and a gravity direction detecting method capable of detecting the gravity direction by simple calculations.

In order to achieve the objects, according to an aspect of the present invention, a mobile device includes: an acceleration detecting portion to detect accelerations in three directions different from each other; a gravity direction detecting portion to detect a gravity direction on the basis of the detected accelerations in the three directions; a gravity direction acceleration calculating portion to calculate an acceleration in the detected gravity direction on the basis of the detected accelerations in the three directions; and a step counting portion to count the number of steps on the basis of the calculated gravity direction acceleration.

According to another aspect of the present invention, a mobile device includes: three acceleration detecting portions to detect accelerations in three directions, respectively, the three directions being different from each other; an acceleration calculating portion to calculate averages of accelerations in a plurality of predetermined directions, respectively, for a predetermined period on the basis of the detected accelerations in the three directions; and a determining portion to determine a direction among the predetermined directions in which the calculated average acceleration takes a value closest to the gravitational acceleration to be a gravity direction.

According to a further aspect of the present invention, a mobile device includes: an acceleration detecting portion to detect an acceleration; a gravity direction detecting portion to detect a gravity direction on the basis of the detected acceleration; a gravity direction acceleration calculating portion to calculate an acceleration in the detected gravity direction on the basis of the detected acceleration; and a step counting portion to count the number of steps on the basis of the calculated gravity direction acceleration.

According to yet another aspect of the present invention, a step counting method includes the steps of: detecting accelerations in three directions different from each other; detecting a gravity direction on the basis of the detected accelerations in the three directions; calculating an acceleration in the detected gravity direction on the basis of the detected accelerations in the three directions; and counting the number of steps on the basis of the calculated gravity direction acceleration.

According to a still further aspect of the present invention, a gravity direction detecting method includes the steps of: detecting accelerations in three directions different from each other; calculating averages of accelerations in a plurality of predetermined directions, respectively, for a predetermined period on the basis of the detected accelerations in the three directions; and determining a direction among the predetermined directions in which the calculated average acceleration takes a value closest to the gravitational acceleration to be a gravity direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view of a mobile phone according to an embodiment of the present invention.

FIG. 4 shows scalars and directions of accelerations in a plurality of directions.

DESCRIPTION OF THE PREFERRED EMBODIMENTS

Figure 2:
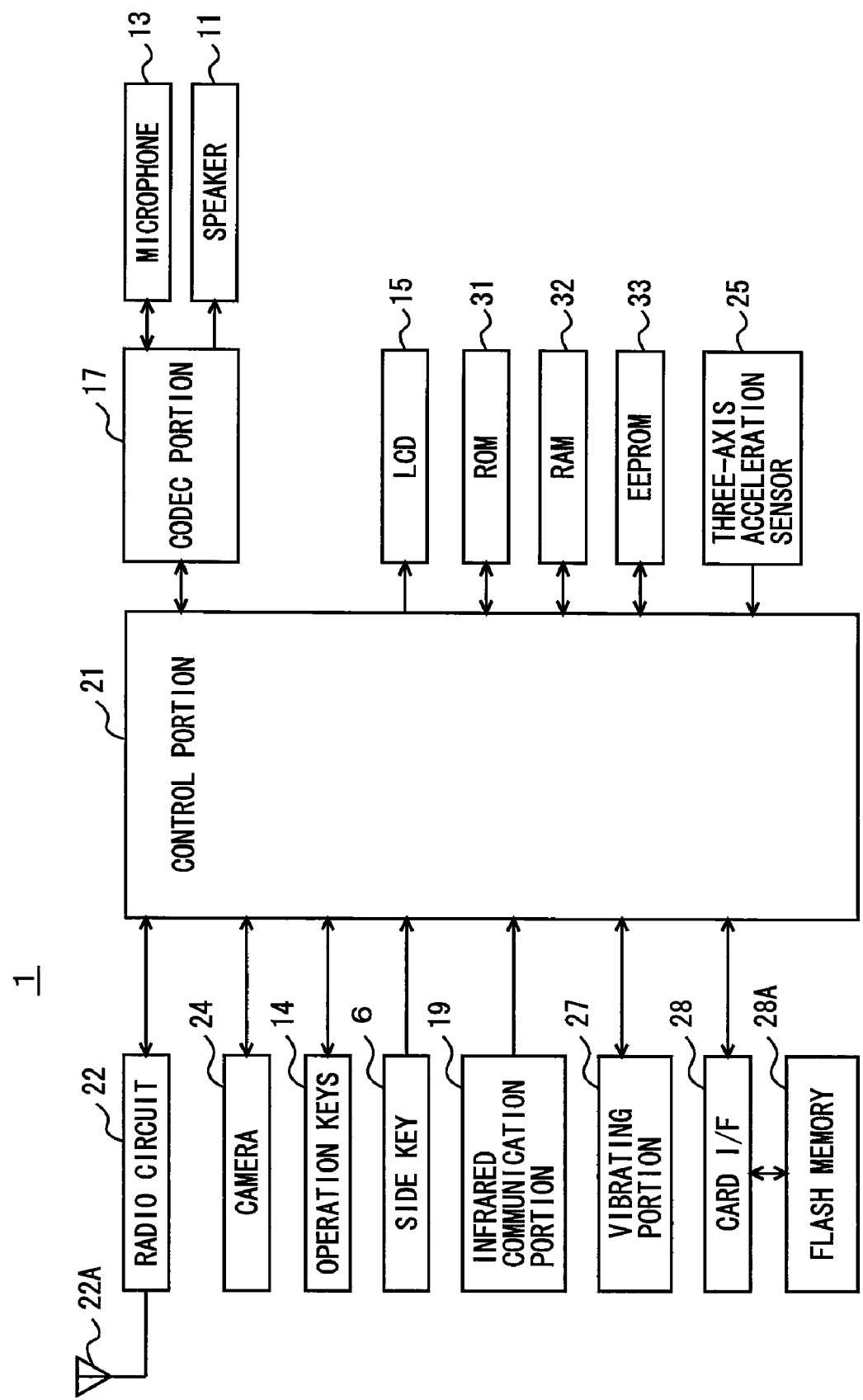
FIG. 2 is a functional block diagram showing by way of example the functions of the mobile phone according to the present embodiment.

Embodiments of the present invention will now be described with reference to the drawings. In the following description, like reference characters denote like parts, which have like names and functions, and therefore, detailed description thereof will not be repeated.

FIG. 1 is a perspective view of a mobile phone according to an embodiment of the present invention. Referring to FIG. 1, a mobile phone 1 as the mobile device includes an operation side portion 3 and a display side portion 2. In operation side portion 3, operation keys 14 including a power key 14A, a ten-key pad, and a talk key, and a microphone 13 are arranged on the inner surface of operation side portion 3, and a side key 6 is arranged on the side surface thereof. In display side portion 2, a liquid crystal display (LCD) 15, a speaker 11 constituting a receiver, and a camera 24 are arranged on the inner surface of display side portion 2. While it is here assumed that mobile phone 1 is provided with LCD 15, an organic electro-luminescence (EL) display may be used in place of LCD 15.

Operation side portion 3 and display side portion 2 are rotatably connected by a hinge mechanism, allowing operation side portion 3 and display side portion 2 to be freely opened and closed. The state in which mobile phone 1 is folded, with operation side portion 3 and display side portion 2 being in the closed state, corresponds to a closed style, while the state in which mobile phone 1 is open, with operation side portion 3 and display side portion 2 being in the open state, corresponds to an open style. When mobile phone 1 is closed, the display surface of LCD 15, which is facing operation side portion 3, cannot be seen from the outside.

Here, a coordinate system is defined with reference to mobile phone 1 in which an X axis corresponds to an axis parallel to the rotational axis of the hinge mechanism connecting operation side portion 3 and display side portion 2, a Y axis corresponds to a longitudinal direction of operation side portion 3, and a Z axis corresponds to a direction perpendicular to the operation surface of operation side portion 3.

A vibrating portion 27 is built in operation side portion 3. Vibrating portion 27 includes an eccentric weight, and a motor which rotates the weight about the X axis serving as the rotational axis. While vibrating portion 27 is arranged near the hinge in operation side portion 3 in the illustrated example, not limited thereto, vibrating portion 27 may be arranged in either operation side portion 3 or display side portion 2. Further, while it is here assumed that vibrating portion 27 is configured to rotate the weight about the X axis serving as the rotational axis, the rotational axis may be defined in any direction.

FIG. 2 is a functional block diagram showing by way of example the functions of the mobile phone according to the present embodiment. Referring to FIG. 2, mobile phone 1 includes: a control portion 21 responsible for overall control of mobile phone 1; a radio circuit 22 connected to an antenna 22A; a codec portion 17 for processing audio data; microphone 13 and speaker 11 each connected to codec portion 17; camera 24; operation keys 14 and side key 6 for accepting inputs of user's operations; an infrared communication portion 19; vibrating portion 27; a card interface (I/F) 28; LCD 15; a read only memory (ROM) 31 for storing a program to be executed by control portion 21 and the like; a random access memory (RAM) 32 used as a work area for control portion 21; an electrically erasable and programmable ROM (EEPROM) 33 for storing data in a non-volatile manner; and a three-axis acceleration sensor 25.

Radio circuit 22 communicates by radio with a base station apparatus connected to a communication network. A radio signal transmitted from the base station apparatus is received by antenna 22A. Radio circuit 22 receives and demodulates the radio signal received by antenna 22A, and outputs the resultant audio signal to codec portion 17. Further, radio circuit 22 receives and modulates an audio signal from codec portion 17, and outputs the resultant radio signal to antenna 22A. The radio signal transmitted from antenna 22A is received by the base station apparatus.

Codec portion 17 decodes an audio signal input from radio circuit 22, converts the decoded digital audio signal to an analog signal, amplifies the signal, and outputs the amplified signal to speaker 11. Further, codec portion 17 receives an analog audio signal from microphone 13, converts the audio signal to a digital signal, codes the signal, and outputs the coded audio signal to radio circuit 22.

Card I/F 28 is mounted with a removable flash memory 28A. Control portion 21 is capable of accessing flash memory 28A via card I/F 28. While it is here assumed that the program to be executed by control portion 21 is stored in ROM 31, the program may be stored in flash memory 28A in advance, and read therefrom to be executed by control portion 21. The recording medium for storing the program is not restricted to flash memory 28A. It may be a flexible disk, a cassette tape, an optical disk (compact disc-ROM (CD-ROM), magneto-optic (MO) disc, mini disc (MD), digital versatile disc (DVD)), an IC card, an optical card, or a semiconductor memory such as a mask ROM, an erasable and programmable ROM (EPROM), an EEPROM, or the like. Still alternatively, mobile phone 1 may be connected to the Internet via radio circuit 22, and the program may be downloaded from a computer connected to the Internet, to be executed by control portion 21. As used herein, the "program" includes, not only the program which can be executed directly by control portion 21, but also a source program, a compressed program, an encrypted program, and others.

Camera 24 is provided with a lens and a photoelectric conversion element such as a complementary metal oxide semiconductor (CMOS) sensor. Light gathered by the lens is focused onto the CMOS sensor. The CMOS sensor performs photoelectric conversion of the received light into image data, and outputs the image data to control portion 21. Camera 24, controlled by control portion 21, starts an image pickup operation in accordance with an instruction from control portion 21, and outputs the obtained data of still or moving images to control portion 21. Camera 24 includes an image processing circuit which carries out image processing to improve image quality of the image data, and an A/D conversion circuit which converts the image data from analog to digital form. Control portion 21 causes LCD 15 to display the still or moving image data output from camera 24. Alternatively, control portion 21 codes the still or moving image data by a compression coding scheme, and stores the data in EEPROM 33 or flash memory 28A mounted to card I/F 28.

Infrared communication portion 19 transmits/receives data through the medium of infrared rays. For example, infrared communication portion 19 transmits data to and receives data from an external apparatus in accordance with the Infrared Data Association (IrDA) standard. While it is here assumed that the device transmits and receives data via the medium of infrared rays, alternatively, the device may communicate with external apparatuses by a radio communication using electromagnetic waves. Furthermore, a serial or parallel interface may be provided in place of, or in addition to, infrared communication portion 19, in which case a communication cable may be used to connect to the external apparatus to transmit data to or receive data from the external apparatus.

Three-axis acceleration sensor 25 detects accelerations along the X axis, the Y axis, and the Z axis, respectively, and outputs the detected accelerations to control portion 21. While it is here assumed that three-axis acceleration sensor 25 detects the accelerations along the X axis, the Y axis, and the Z axis, it may detect the accelerations in any three directions which cross each other, or it may detect the accelerations in four or more directions.

Figure 3:
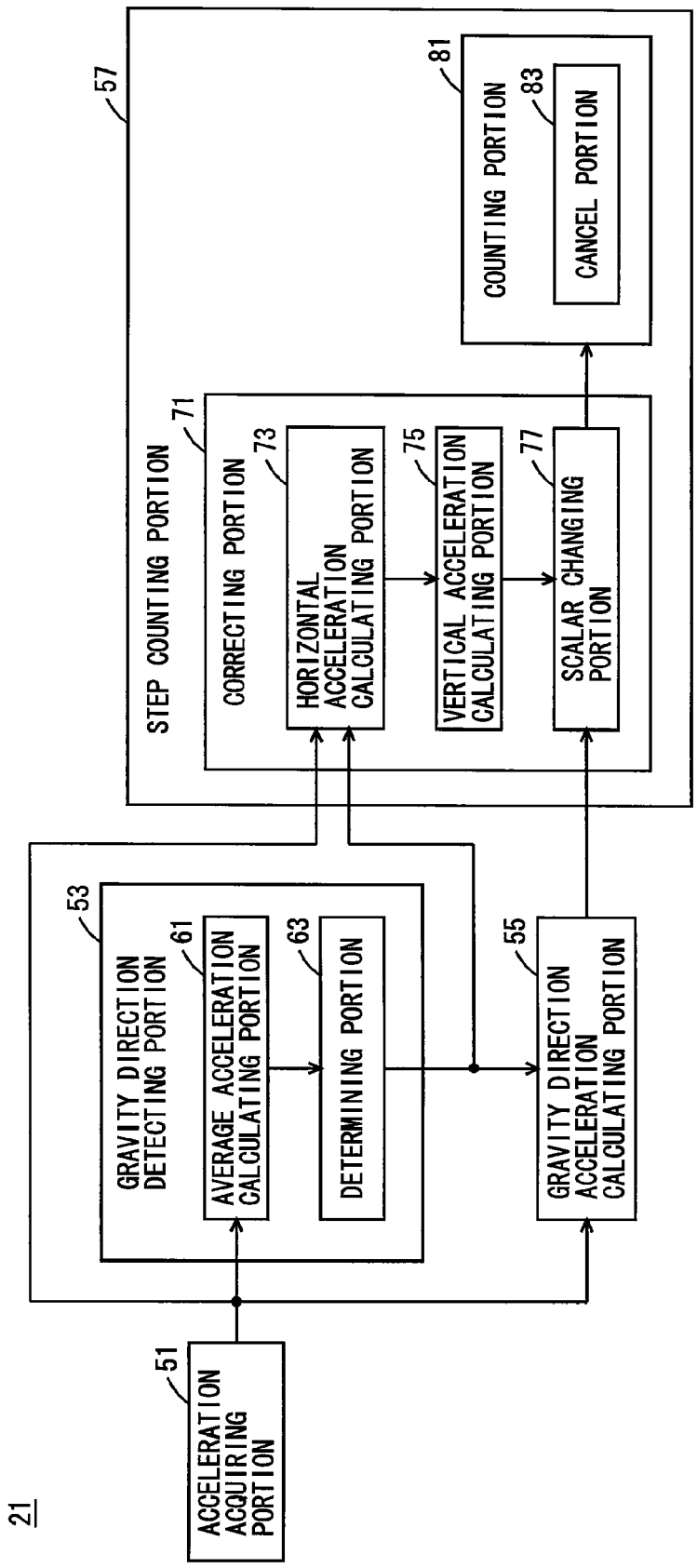
FIG. 3 is a functional block diagram schematically showing the functions of a control portion.

FIG. 3 is a functional block diagram schematically showing the functions of the control portion. Referring to FIG. 3, control portion 21 includes: an acceleration acquiring portion 51 to acquire accelerations in three directions; a gravity direction detecting portion 53 to detect a direction of gravity (gravity direction); a gravity direction acceleration calculating portion 55 to calculate an acceleration in the gravity direction (gravity direction acceleration); and a step counting portion 57 to count the number of steps.

Acceleration acquiring portion 51 receives the accelerations along the X, Y, and Z axes which are output from three-axis acceleration sensor 25. Acceleration acquiring portion 51 outputs the accelerations received from three-axis acceleration sensor 25 to gravity direction detecting portion 53, gravity direction acceleration calculating portion 55, and step counting portion 57.

Gravity direction detecting portion 53 includes an average acceleration calculating portion 61 and a determining portion 63. Average acceleration calculating portion 61 averages the accelerations along the X, Y, and Z axes which are input from acceleration acquiring portion 51 during a predetermined period, to calculate average accelerations along the X, Y, and Z axes, respectively. The predetermined period during which the accelerations along the X, Y, and Z axes are input from acceleration acquiring portion 51 is preferably 0.25 to 0.5 seconds, taking into consideration the walking cycle of a person, which is 2 to 4 Hz. Averaging the accelerations along the X, Y, and Z axes for the predetermined period can exclude the acceleration generated by mobile phone 1 as it vibrates along with the walking of the person. Furthermore, in the case where vibrating portion 27 is working, the acceleration generated by the vibration of vibrating portion 27 can be excluded. Average acceleration calculating portion 61 outputs the calculated average accelerations along the X, Y, and Z axes to determining portion 63.

Determining portion 63 determines the gravity direction on the basis of the average accelerations along the X, Y, and Z axes which are input from average acceleration calculating portion 61. Specifically, the direction in which an acceleration obtained from a combination of the average accelerations along the X, Y, and Z axes becomes the gravitational acceleration G (9.8 m/s$^2$) is determined to be the gravity direction.

Here, for simplification of computation, accelerations in a plurality of predetermined directions are obtained, and the direction among those predetermined directions in which the acceleration takes a value closest to the gravitational acceleration G is determined to be the gravity direction. Although the gravity direction determined in this manner may differ from the actual gravity direction in the strict sense, such a difference can be regard as an error when counting the number of steps.

FIG. 4 shows scalars and directions of the accelerations in a plurality of directions. Here, 26 directions from No. 1 to No. 26 and scalars thereof are defined. As seen from the figure, the scalars can be calculated using only seven formulas. Thus, the gravity direction may be determined with simple calculations of: determining one of the scalars obtained from the seven formulas that becomes closest to that of the gravitational acceleration G, and determining the direction in accordance with the signs of the average accelerations in the X, Y, and Z axis directions at that time. It is noted that the sign "N" in the figure means that the acceleration in that direction is not used as a basis of the scalar calculation.

Returning to FIG. 3, determining portion 63 outputs the gravity direction thus determined, to gravity direction acceleration calculating portion 55 and step counting portion 57. Gravity direction acceleration calculating portion 55 uses the accelerations along the X, Y, and Z axes input from acceleration acquiring portion 51 to calculate the acceleration according to the component in the gravity direction that is input from determining portion 63, and outputs the calculated acceleration in the gravity direction (gravity direction acceleration) to step counting portion 57.

Step counting portion 57 includes a correcting portion 71 to exclude the acceleration generated by vibrating portion 27 from the gravity direction acceleration, and a counting portion 81 to count the number of steps from the corrected gravity direction acceleration. Correcting portion 71 includes a horizontal acceleration calculating portion 73 and a vertical acceleration calculating portion 75, which calculate the accelerations in the horizontal and vertical directions, respectively, of the acceleration generated while vibrating portion 27 is working. Correcting portion 71 also includes a scalar changing portion 77.

Horizontal acceleration calculating portion 73 receives the gravity direction from determining portion 63, and receives the accelerations along the X, Y, and Z axes from acceleration acquiring portion 51. Horizontal acceleration calculating portion 73 determines a horizontal direction which is perpendicular to the gravity direction input from determining portion 63 and also perpendicular to the rotational axis (X axis) of vibrating portion 27. Then, horizontal acceleration calculating portion 73 calculates, from the accelerations along the X, Y, and Z axes input from acceleration acquiring portion 51, the acceleration according to the component in the determined horizontal direction, and outputs the calculated acceleration in the horizontal direction (horizontal acceleration) to vertical acceleration calculating portion 75. In vibrating portion 27, its weight rotates about the X axis, so that no acceleration is generated in the X axis direction. The horizontal direction is set to the direction perpendicular to the gravity direction and perpendicular to the X axis, and thus, vibrating portion 27 generates only the gravity direction acceleration and the horizontal acceleration. Accordingly, assuming that the person walks at a constant rate, the horizontal acceleration is regarded as an acceleration that is generated solely by vibrating portion 27.

Vertical acceleration calculating portion 75 calculates the acceleration in the vertical direction (vertical acceleration)

generated by vibrating portion 27, from the acceleration generated by vibrating portion 27 and the horizontal acceleration received from horizontal acceleration calculating portion 73. The acceleration generated by vibrating portion 27 may be predetermined with measurement, and the vertical acceleration may be calculated based on that predetermined acceleration generated by vibrating portion 27. It is noted that for the vertical component, two types of accelerations can be calculated, which are identical in absolute value of the amplitude and different in phase by 90 degrees. At this time, the absolute value (scalar) of the amplitude which is the same for the calculated two types of accelerations is output to scalar changing portion 77.

Scalar changing portion 77 receives the gravity direction acceleration from gravity direction acceleration calculating portion 55, and receives the scalar of the vertical acceleration generated by vibrating portion 27 from vertical acceleration calculating portion 75. Scalar changing portion 77 changes the scalar of the gravity direction acceleration input from gravity direction acceleration calculating portion 55, to a value that is derived by subtracting therefrom the scalar input from vertical acceleration calculating portion 75. Scalar changing portion 77 then outputs the gravity direction acceleration of which the scalar has been changed, to counting portion 81.

Figure 5:
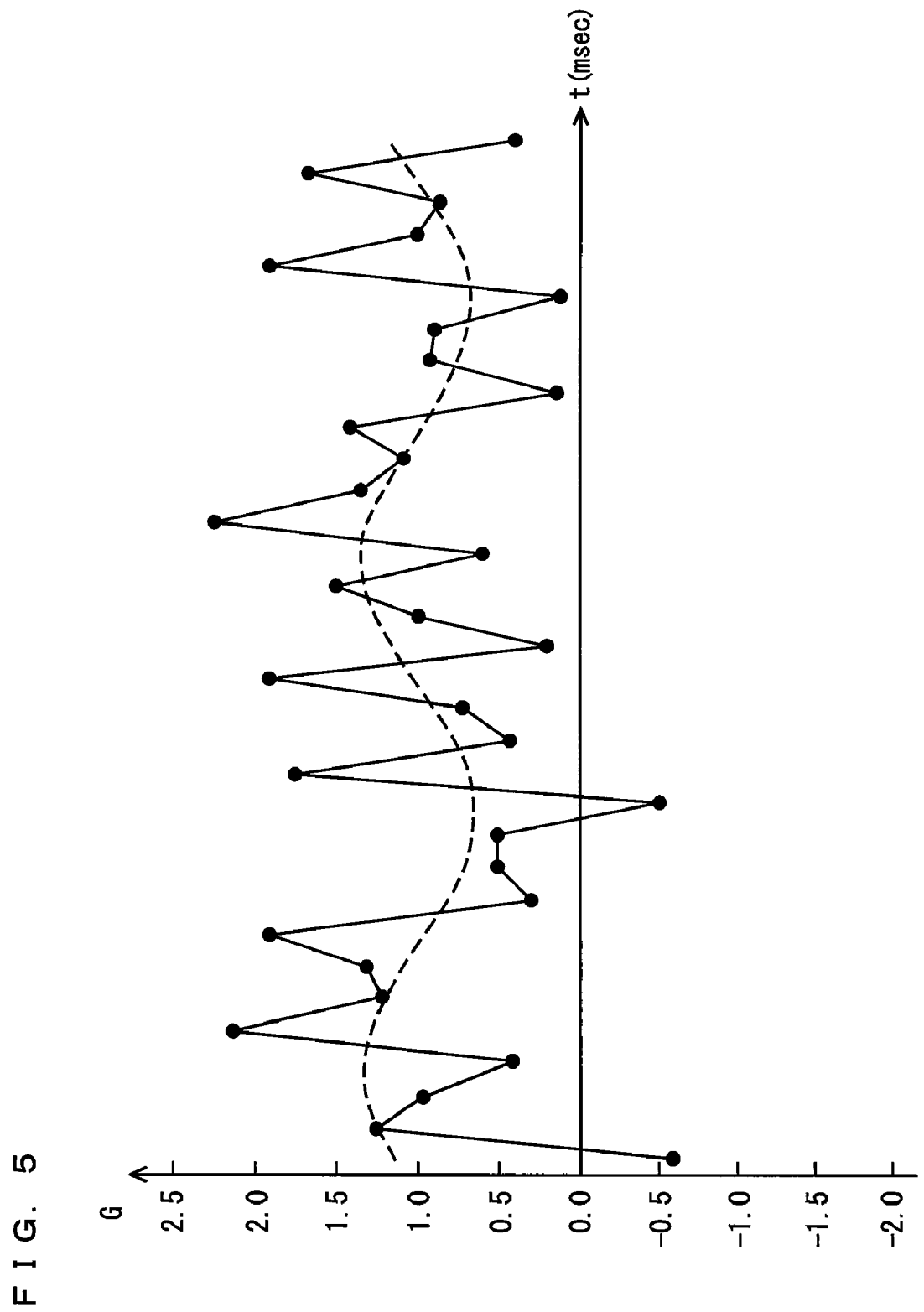
FIG. 5 shows by way of example a gravity direction acceleration.

FIG. 5 shows by way of example the gravity direction acceleration. Referring to FIG. 5, the horizontal axis represents time (msec), and the vertical axis represents the gravity acceleration in the vertical direction (G). A dotted line indicates an ideal gravity direction acceleration during walking, and a solid line connects the accelerations in the gravity direction which have been plotted. The gravity direction acceleration becomes greater than the ideal gravity direction acceleration periodically, because of the acceleration generated by vibrating portion 27 superimposed thereto.

Figure 6:
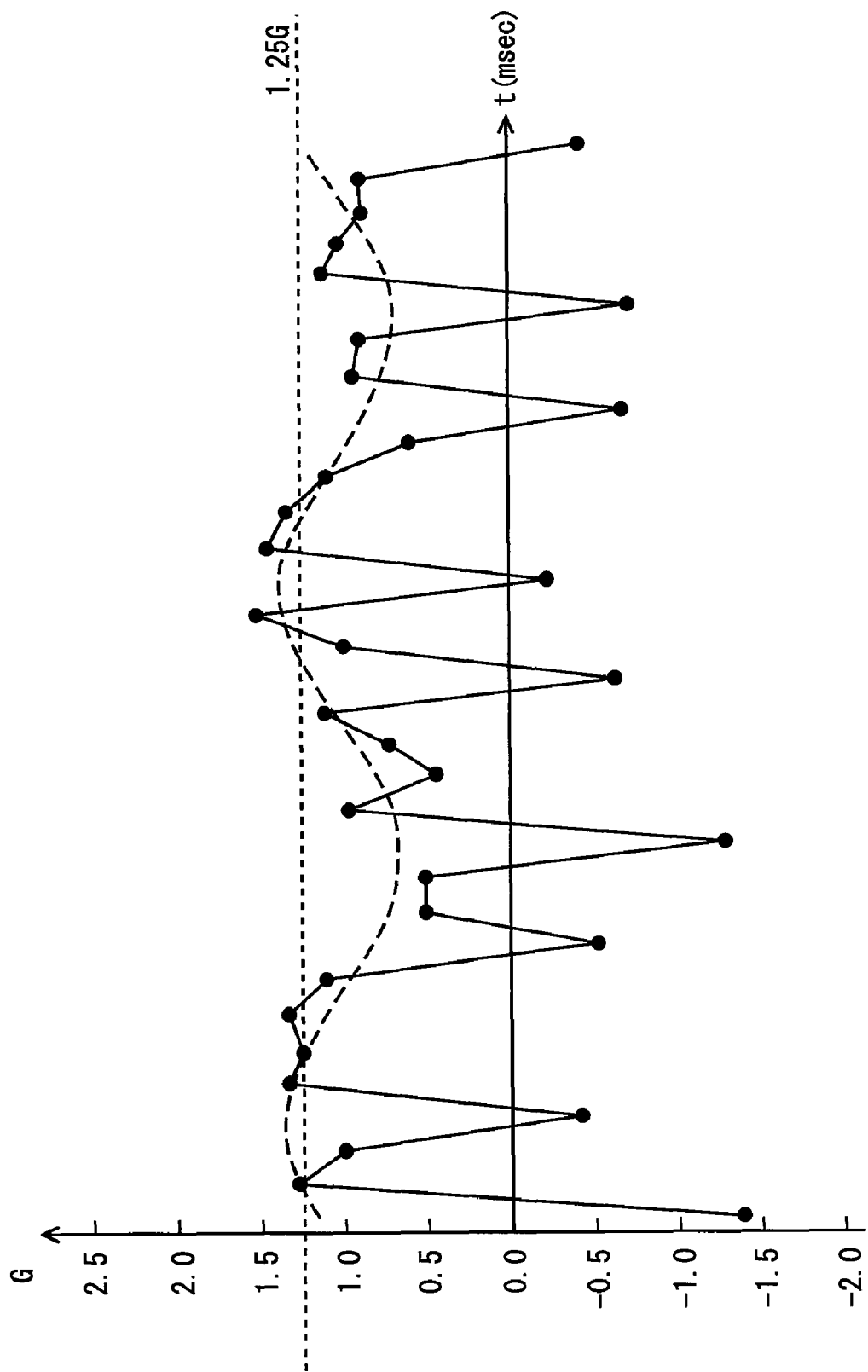
FIG. 6 shows by way of example the gravity direction acceleration of which the scalar has been changed.

FIG. 6 shows by way of example the gravity direction acceleration of which the scalar has been changed. Referring to FIG. 6, the horizontal axis represents time (msec), and the vertical axis represents the gravity acceleration in the vertical direction (G). A dotted line indicates an ideal gravity direction acceleration during walking, and a solid line connects the accelerations in the gravity direction plotted. The gravity direction acceleration shown in FIG. 6 differs from that shown in FIG. 5 in that the gravity direction acceleration considerably larger than the ideal gravity direction acceleration is eliminated, indicating that the acceleration generated by vibrating portion 27 has been excluded. On the other hand, the gravity direction acceleration considerably smaller than the ideal gravity direction acceleration appears periodically. This is because the scalar of the gravity direction acceleration has been modified based on the absolute value (scalar) of the amplitude which is the same for the two types of accelerations calculated by vertical acceleration calculating portion 75. That is, the scalar has been subtracted where it should have been added.

Returning to FIG. 3, counting portion 81 counts the number of instances where the gravity direction acceleration input from scalar changing portion 77 exceeds a predetermined threshold value, which is here set to be 1.25 G. Counting portion 81 includes a cancel portion 83, which cancels counting of the number of such instances within a predetermined period after the number of the instances is once counted. This predetermined period is preset within a range of 0.5 to 0.25 seconds based on the 2 to 4 Hz walking cycle of a person. The predetermined period is preferably 0.25 seconds.

Calculation by vertical acceleration calculating portion 75 results in two types of accelerations, and it is difficult to determine which type of acceleration is appropriate. Thus, scalar changing portion 77 has changed the scalar of the gravity direction acceleration using the absolute value (scalar) of the amplitude which is the same for the two types of accelerations calculated by vertical acceleration calculating portion 75. This allows the number of instances where the gravity direction acceleration exceeds the threshold value to be counted only once during the period corresponding to the walking cycle of a person, whereby the number of steps can be counted.

Figure 7:
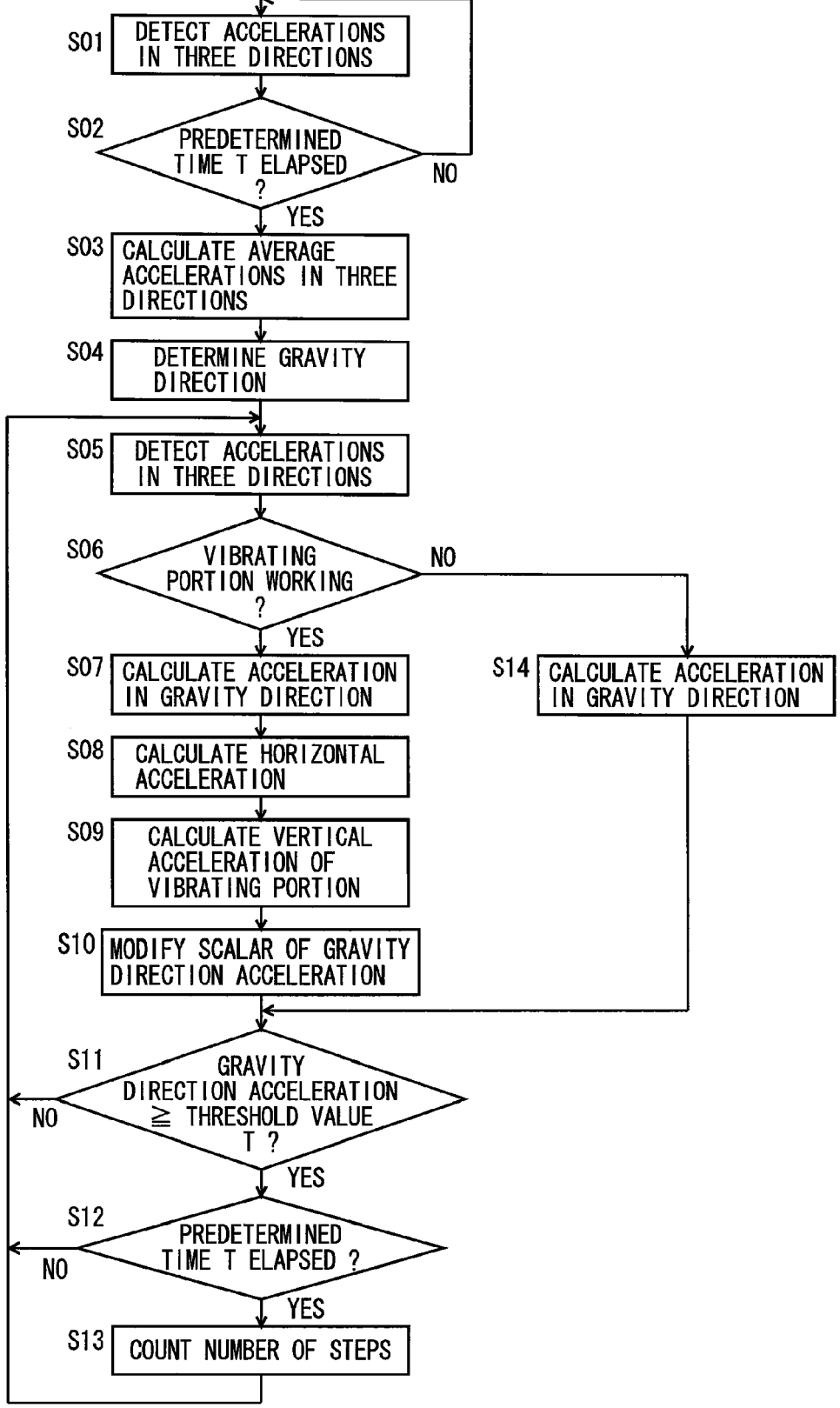
FIG. 7 is a flowchart illustrating an example of the flow of step counting processing.

FIG. 7 is a flowchart illustrating an example of the flow of step counting processing. The step counting processing is carried out by control portion 21 as control portion 21 executes a step counting program. Referring to FIG. 7, control portion 21 detects accelerations in three directions (step S01). Specifically, control portion 21 detects the accelerations along the X, Y, and Z axes which are output from three-axis acceleration sensor 25. Step S01 is repeated until a predetermined time T elapses. After a lapse of the predetermined time T (YES in step S02), the process proceeds to step S03 when the accelerations along the X, Y, and Z axes detected during the predetermined time T have been acquired. The predetermined time T is preferably 0.5 seconds in consideration of the walking cycle of a person.

In step S03, average accelerations are calculated respectively for the accelerations along the X, Y, and Z axes detected during the predetermined time T in step S01. This can exclude the accelerations generated by vibrating portion 27 and by walking. Then, a gravity direction is determined from the average accelerations along the X, Y, and Z axes (step S04). Specifically, the direction in which the acceleration derived from a combination of the average accelerations along the X, Y, and Z axes is closest to the gravitational acceleration G is determined to be the gravity direction. Here, for simplification of computation, the accelerations in a plurality of predetermined directions are obtained from the average accelerations along the X, Y, and Z axes, and the direction among those predetermined directions in which the acceleration takes a value closest to the gravitational acceleration G is determined to be the gravity direction.

In step S05, the accelerations in three directions are detected. Specifically, the accelerations along the X, Y, and Z axes output from three-axis acceleration sensor 25 are detected. Then, in step S06, it is determined whether vibrating portion 27 is working. If so, the process proceeds to step S07; otherwise, the process proceeds to step S14. The process is branched in this manner because vibrating portion 27 will generate vibration while working.

In step S07, the acceleration in the gravity direction which has been determined in step S04 is calculated from the accelerations along the X, Y, and Z axes which have been detected in step S05. Then, the acceleration in the horizontal direction is calculated from the accelerations along the X, Y, and Z axes detected in step S05 (step S08). The horizontal direction is perpendicular to the gravity direction determined in step S04 and also perpendicular to the rotational axis (X axis) of vibrating portion 27.

Next, the acceleration in the vertical direction is calculated from the acceleration generated by vibrating portion 27 while vibrating portion 27 is working (step S09). The acceleration generated by vibrating portion 27 while vibrating portion 27 is working is known. With the horizontal acceleration calculated in step S08 being regarded as the horizontal acceleration that is generated by vibrating portion 27 while vibrating portion 27 is working, the vertical acceleration that is generated by vibrating portion 27 while vibrating portion 27 is working is calculated from the acceleration generated by vibrating portion 27 while vibrating portion 27 is working and the horizontal acceleration calculated in step S08.

In step S10, the scalar of the gravity direction acceleration which has been calculated in step S07 is modified, before the process proceeds to step S11. Specifically, the scalar of the gravity direction acceleration calculated in step S07 is changed to a value that is derived by subtracting therefrom the scalar of the vertical acceleration generated by vibrating portion 27 while vibrating portion 27 is working, which has been calculated in step S09. In this manner, the vertical acceleration generated by vibrating portion 27 while vibrating portion 27 is working is subtracted from the gravity direction acceleration calculated in step S07.

On the other hand, in step S14, the acceleration in the gravity direction determined in step S04 is calculated from the accelerations along the X, Y, and Z axes detected in step S05, and the process proceeds to step S11.

In step S11, it is determined whether the gravity direction acceleration of which the scalar has been modified in step S10, or the gravity direction acceleration calculated in step S14, is not less than a threshold value T (1.25 G). If the gravity direction acceleration is equal to or greater than the threshold value T, the process proceeds to step S12; otherwise, the process returns to step S05. In step S12, it is determined whether a predetermined time T has elapsed since the number of steps has been counted in step S13. If the predetermined time T has elapsed (YES in step S12), the process proceeds to step S13; otherwise (NO in step S12), the process returns to step S05. In the case where the number of steps has not been counted in step S13 and thus the step counter indicates "0", the process proceeds to step S13, without waiting for a lapse of the predetermined time. After the number of steps is counted once, the counting is stopped until the predetermined time elapses. In step S13, the number of steps is counted up, and the process returns to step S05.

In step S09, two types of accelerations are calculated as the vertical acceleration generated by vibrating portion 27 while vibrating portion 27 is working, and it is difficult to determine which acceleration is appropriate. Thus, in step S10, the scalar of the gravity direction acceleration calculated in step S07 is modified using the absolute value (scalar) of the amplitude which is the same for the two types of accelerations. This allows the number of instances where the gravity direction acceleration exceeds the threshold value to be counted only once during the period corresponding to the walking cycle of a person, whereby the number of steps can be counted.

<Modification>

In the above-described embodiment, it is configured such that two types of accelerations are obtained as the vertical acceleration generated by vibrating portion 27 while vibrating portion 27 is working, and that the scalar of the gravity direction acceleration is modified using the absolute value (scalar) of the amplitude which is the same for the two types of accelerations. In the mobile phone 1 according to a modification, the accuracy in modifying the scalar of the gravity direction acceleration is improved by utilizing the fact that the gravity direction acceleration generated by walking generally exceeds 0.5 G.

Figure 8:
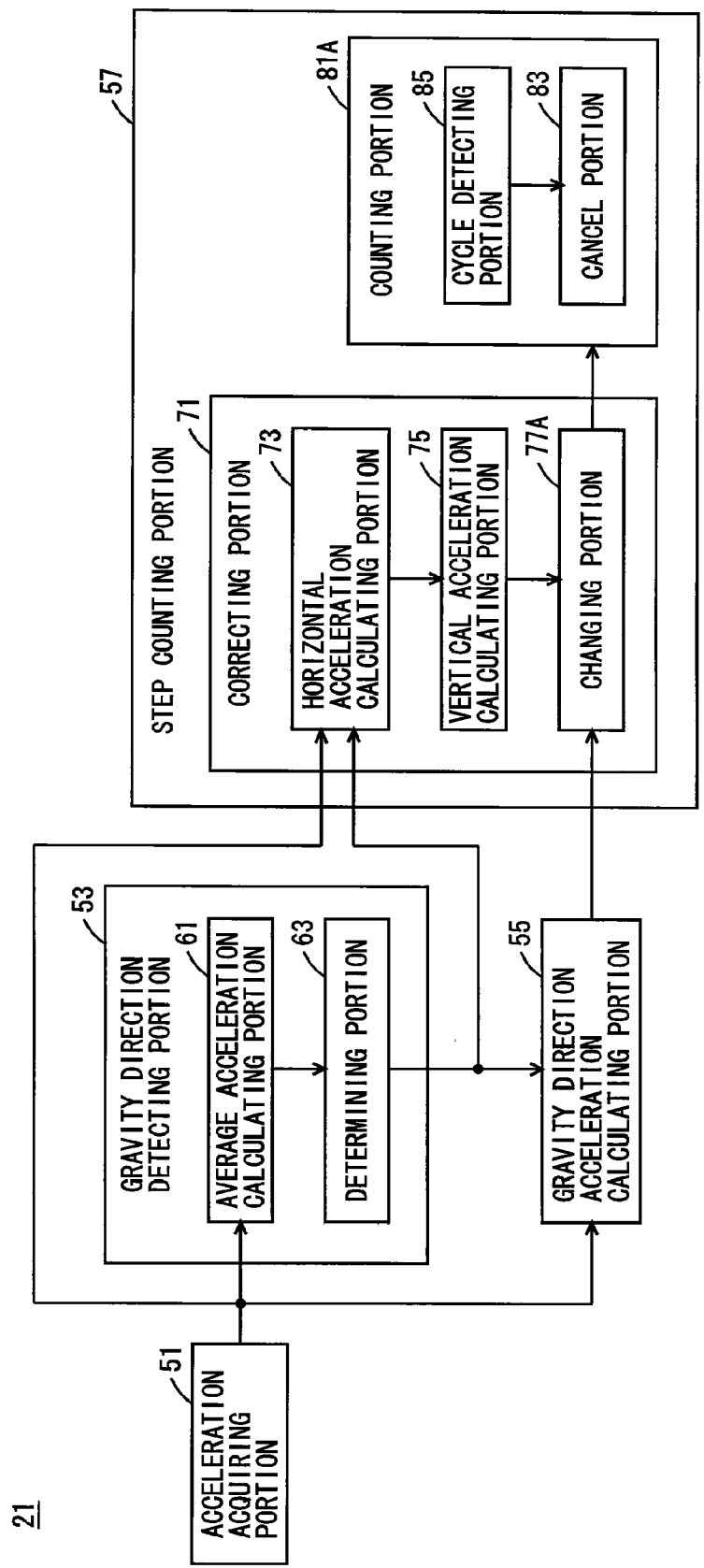
FIG. 8 is a functional block diagram schematically showing the functions of the control portion which is provided in a mobile phone according to a modification.

FIG. 8 is a functional block diagram schematically showing the functions of the control portion which is provided in the mobile phone according to the modification. The functional block diagram shown in FIG. 8 differs from that shown in FIG. 3 in that changing portion 77A and counting portion 81A have been modified. The remaining functions are identical to those shown in FIG. 3, and thus, description thereof will not be repeated here.

Changing portion 77A receives the gravity direction acceleration from gravity direction acceleration calculating portion 55, and receives the scalar of the vertical acceleration generated by vibrating portion 27, from vertical acceleration calculating portion 75. Changing portion 77A calculates a scalar value by subtracting the scalar input from vertical acceleration calculating portion 75 from the scalar of the gravity direction acceleration input from gravity direction acceleration calculating portion 55 to determine whether the resulting scalar value is not greater than 0.5 G. If the resulting scalar value is equal to or smaller than 0.5 G, changing portion 77A changes the scalar of the gravity direction acceleration input from gravity direction acceleration calculating portion 55, to a value that is derived by adding thereto the scalar input from vertical acceleration calculating portion 75. On the other hand, if the resulting scalar value is greater than 0.5 G, changing portion 77A changes the scalar of the gravity direction acceleration input from gravity direction acceleration calculating portion 55, to a value that is derived by subtracting therefrom the scalar input from vertical acceleration calculating portion 75.

Figure 9:
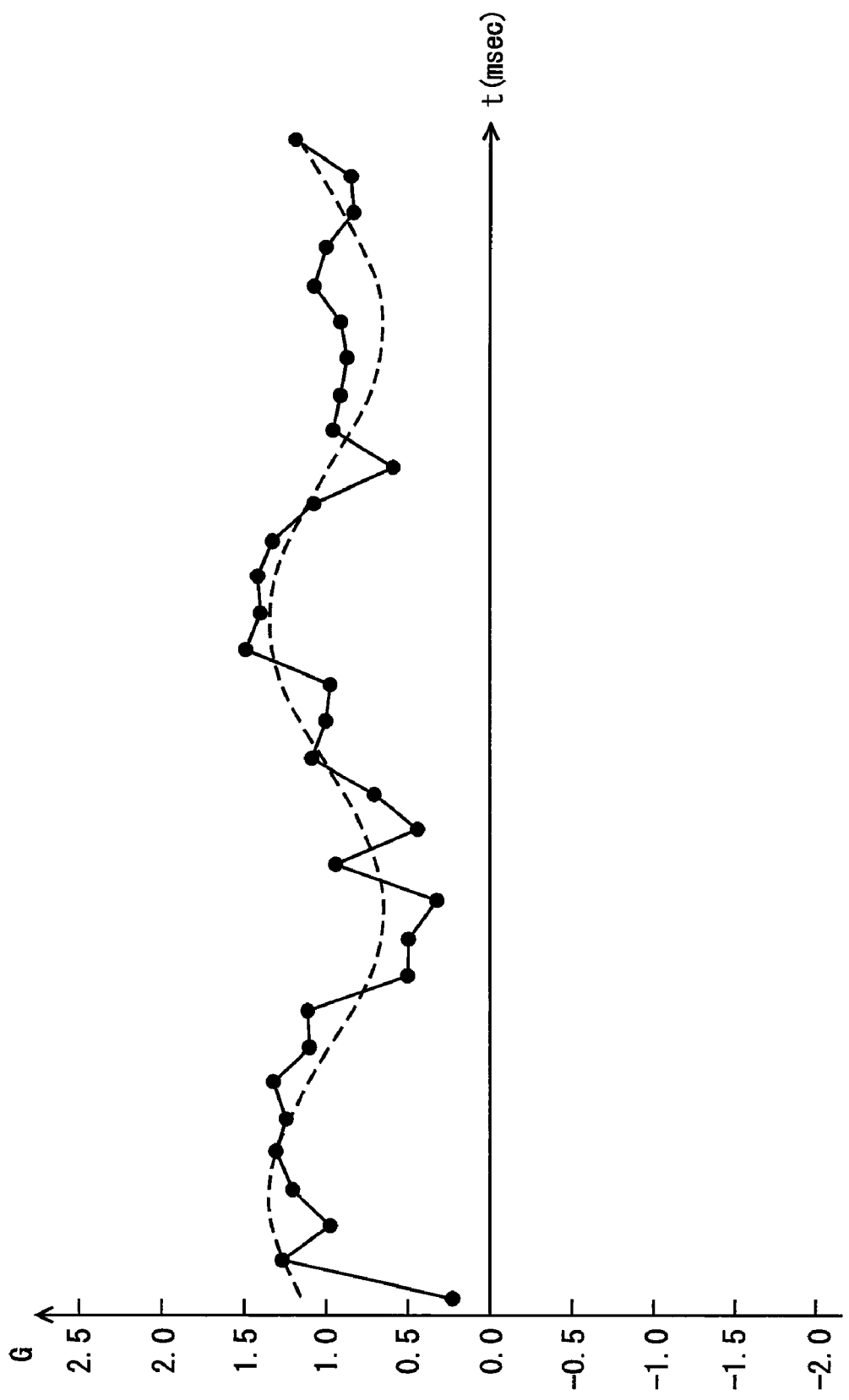
FIG. 9 shows by way of example the gravity direction acceleration of which the scalar has been changed, according to the modification.

FIG. 9 shows by way of example the gravity direction acceleration of which the scalar has been changed, according to the modification. Specifically, it shows the gravity direction acceleration after the scalar of the gravity direction acceleration shown in FIG. 5 has been changed. Referring to FIG. 9, the horizontal axis represents time (msec), and the vertical axis represents the gravity acceleration in the vertical direction (G). A dotted line indicates an ideal gravity direction acceleration during walking, and a solid line connects the accelerations in the gravity direction plotted. In the gravity direction acceleration shown in FIG. 9, as compared with that shown in FIG. 6, the gravity direction acceleration considerably smaller than the ideal gravity direction acceleration, which is generated periodically, is eliminated.

Returning to FIG. 8, counting portion 81A further includes a cycle detecting portion 85. Cycle detecting portion 85 detects the cycle of changes of the gravity direction acceleration of which the scalar has been modified, which is input from changing portion 77A. The cycle of changes of the gravity direction acceleration indicates the walking cycle. Cycle detecting portion 85 outputs the detected cycle to cancel portion 83.

After the number of instances where the gravity direction acceleration exceeds a predetermined threshold value is once counted, cancel portion 83 cancels counting of the number of such instances within the cycle which is input from cycle detecting portion 85. This allows counting of the number of the instances to be performed only once during the walking cycle, thereby ensuring accurate counting of the number of steps.

Figure 10:
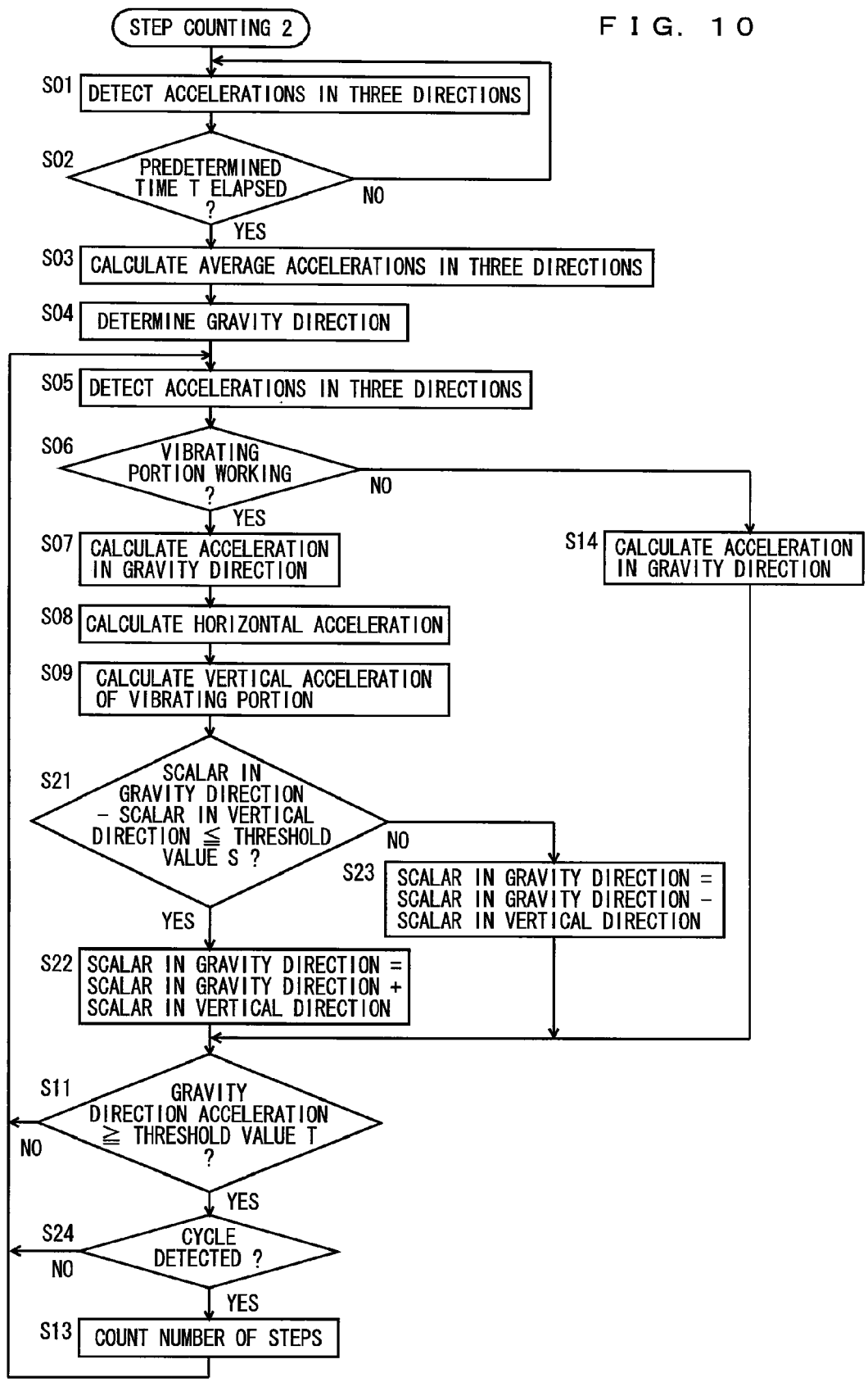
FIG. 10 is a flowchart illustrating an example of the flow of the step counting processing according to the modification.

FIG. 10 is a flowchart illustrating an example of the flow of the step counting processing according to the modification. The step counting processing in the modification is carried out by control portion 21 as control portion 21 executes the step counting program. The step counting processing illustrated in FIG. 10 differs from that illustrated in FIG. 7 in that step S10 is replaced with steps S21 to S23, and step S12 is replaced with step S24. The remaining processes in FIG. 10 are identical to those in FIG. 7, and thus, description thereof will not be repeated here.

In steps S21 to S23, the scalar of the gravity direction acceleration which has been calculated in step S07 is modified. Specifically, in step S21, it is determined whether a value obtained by subtracting the scalar of the vertical acceleration calculated in step S09 from the scalar of the gravity direction acceleration calculated in step S07 is not greater than a threshold value S (0.5 G). If changing portion 77A determines that the calculated scalar value is equal to or smaller than the threshold value S, the process proceeds to step S22; otherwise, the process proceeds to step S23. In step S22, the scalar of the gravity direction acceleration calculated in step S07 is changed to a value that is derived by adding thereto the scalar of the vertical acceleration calculated in step S09, before the process proceeds to step S11. On the other hand, in step S23, the scalar of the gravity direction acceleration calculated in step S07 is changed to a value that is derived by subtracting therefrom the scalar of the vertical acceleration calculated in step S09, and the process proceeds to step S11.

In step S11, it is determined whether the gravity direction acceleration of which the scalar has been modified in step S22 or S23, or the gravity direction acceleration calculated in step S14, is not smaller than a threshold value T (1.25 G). If the gravity direction acceleration is equal to or greater than the threshold value T, the process proceeds to step S24; otherwise, the process returns to step S05.

In step S24, it is determined whether one cycle of the gravity direction acceleration of which the scalar has been modified in step S22 or S23, or that of the gravity direction acceleration calculated in step S14, has been detected. If one cycle has elapsed (YES in step S24), the process proceeds to step S13; otherwise (NO in step S24), the process returns to step S05. In step S13, the number of steps is counted up, before the process returns to step S05. If the number of steps has not been counted in step S13 and thus the step counter indicates "0", the process proceeds to step S13 without waiting for a lapse of one cycle.

In step S13, the number of steps is counted only after one cycle has elapsed since the number of steps was counted previously. This allows the number of instances where the gravity direction acceleration exceeds the threshold value to be counted only once during the period corresponding to the walking cycle of a person, whereby the accuracy in counting the number of steps is improved.

Further, when vibrating portion 27 is working, the gravity direction acceleration calculated is corrected using the vertical acceleration which is generated by vibrating portion 27 while vibrating portion 27 is working. Accordingly, the number of steps can be counted even while vibrating portion 27 is working.

Furthermore, the accelerations along the X, Y, and Z axes detected by three-axis acceleration sensor 25 are used to calculate the horizontal acceleration in the direction perpendicular to the gravity direction and perpendicular to the rotational axis (X axis) of vibrating portion 27. Then, based on the calculated horizontal acceleration and a known acceleration which is generated by vibrating portion 27 while vibrating portion 27 is working, the vertical acceleration which is generated by vibrating portion 27 while vibrating portion 27 is working is calculated. The scalar of the gravity direction acceleration calculated is changed to a value that is derived by subtracting the scalar of the vertical acceleration from the scalar of the gravity direction acceleration calculated. Moreover, after the number of instances where the gravity direction acceleration exceeds a predetermined threshold value is once counted, counting of the number of such instances within the same walking cycle is canceled. This ensures that the gravity direction acceleration can be calculated with accuracy, and at the same time, the number of steps can be counted with accuracy.

Furthermore, according to mobile phone 1 of the modification, the accelerations along the X, Y, and Z axes detected by three-axis acceleration sensor 25 are used to calculate the horizontal acceleration in the direction perpendicular to the gravity direction and perpendicular to the rotational axis (X axis) of vibrating portion 27. Then, based on the calculated horizontal acceleration and the known acceleration which is generated by vibrating portion 27 while vibrating portion 27 is working, the vertical acceleration which is generated by vibrating portion 27 while vibrating portion 27 is working is calculated. A scalar of the gravity direction acceleration calculated is changed in such a manner that, when the value obtained by subtracting the scalar of the vertical acceleration from the scalar of the calculated gravity direction acceleration is not greater than a predetermined threshold value (0.5 G), the scalar of the calculated gravity direction acceleration is changed to a value that is derived by adding the scalar of the vertical acceleration to the scalar of the calculated gravity direction acceleration, and when the value obtained by subtracting the scalar of the vertical acceleration from the scalar of the calculated gravity direction acceleration is greater than the predetermined threshold value, the scalar of the calculated gravity direction acceleration is changed to a value that is derived by subtracting the scalar of the vertical acceleration from the scalar of the calculated gravity direction acceleration, and a vibration cycle is detected from the modified acceleration. Accordingly, the vibration cycle of the modified acceleration(the cycle of changes of the gravity direction acceleration) can be detected. Furthermore, after the number of instances where the gravity direction acceleration exceeds a predetermined threshold value is once counted, counting of the number of such instances within the detected vibration cycle is canceled, whereby the number of steps can be counted with accuracy.

For accelerations in a plurality of predetermined directions, respective averages for a predetermined period are calculated based on the accelerations along the X, Y, and Z axes detected by three-axis acceleration sensor 25, and the direction among those predetermined directions in which the calculated average acceleration takes a value closest to the gravitational acceleration is determined to be a gravity direction. This allows the gravity direction to be detected by simple computation.

While the gravity direction is detected while vibrating portion 27 is not working in the above embodiment, the gravity direction may be detected while vibrating portion 27 is working. The gravity direction is determined from the average accelerations along the X, Y, and Z axes for a predetermined period. This can eliminate the acceleration generated by vibrating portion 27 while vibrating portion 27 is working. As a result, the number of steps can be counted even while vibrating portion 27 is generating vibration.

In the case where the direction to which mobile phone 1 becomes perpendicular while a user carries mobile phone 1 during walking is known, three-axis acceleration sensor 25 can be replaced with a two-axis acceleration sensor which detects accelerations in two directions crossing each other. In this case, it is preferable that one of the two directions crossing each other is the direction to which mobile phone 1 is perpendicular, and the other is the direction perpendicular to the rotational axis of vibrating portion 27 and also perpendicular to the direction to which mobile phone 1 is perpendicular. For example, in the case where the user carries mobile phone 1 in the closed state such that the longitudinal direction (Y axis direction) thereof is vertical, the acceleration in the Y axis direction and the acceleration in the Z axis direction may be detected. In this case, the acceleration in the Z axis direction can be regarded as the acceleration which is generated by vibrating portion 27. Vibrating portion 27 generate no acceleration in the X axis direction. Thus, the acceleration in the Y axis direction (vertical acceleration) which is generated by vibrating portion 27 can be calculated from the acceleration in the Z axis direction (horizontal acceleration) which is detected by the two-axis acceleration sensor. As a result, the acceleration in the Y axis direction (gravity direction acceleration) which is detected by the two-axis acceleration sensor can be corrected such that the acceleration in the Y axis direction (vertical acceleration) which is generated by vibrating portion 27 is excluded therefrom, which enables counting of the number of steps.

While mobile phone 1 has been described as an example of the mobile device in the above embodiment, the present invention may of course be understood as a step counting method or a gravity direction detecting method for causing mobile phone 1 to perform the processing shown in FIG. 7 or 10, or a step counting program or a gravity direction detecting program for causing a computer to execute the step counting method or the gravity direction detecting method.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A mobile device comprising:
an acceleration detecting portion to detect accelerations in three directions different from each other;
a gravity direction detecting portion to detect a gravity direction on the basis of said detected accelerations in the three directions;
a gravity direction acceleration calculating portion to calculate an acceleration in said detected gravity direction on the basis of said detected accelerations in the three directions;
a vibration generating portion to generate vibration by rotating about a predetermined rotational axis; and
a step counting portion to count the number of steps on the basis of said calculated gravity direction acceleration, wherein said step counting portion includes a correcting portion to correct said calculated gravity direction acceleration with an acceleration generated by said vibration generating portion while said vibration generating portion is rotating, and a counting portion to count the number of instances where said corrected acceleration takes a value of not smaller than a threshold value or the number of instances where said corrected acceleration takes a value of not greater than a threshold value.

2. The mobile device according to claim 1, wherein said correcting portion includes
a horizontal acceleration calculating portion to calculate a horizontal acceleration in a direction perpendicular to said gravity direction and perpendicular to said rotational axis on the basis of said detected accelerations in the three directions,
a vertical acceleration calculating portion to calculate a vertical acceleration generated by said vibration generating portion on the basis of said calculated horizontal acceleration and a predetermined acceleration for said vibration generating portion, and
a scalar changing portion to change a scalar of said calculated gravity direction acceleration to a value that is derived by subtracting a scalar of said vertical acceleration from the scalar of said calculated gravity direction acceleration, and
said counting portion includes a cancel portion to cancel counting of the number of said instances within a predetermined period after the number of said instances is once counted.

3. The mobile device according to claim 1, wherein said correcting portion includes
a horizontal acceleration calculating portion to calculate a horizontal acceleration in a direction perpendicular to said gravity direction and perpendicular to said rotational axis on the basis of said detected accelerations in the three directions,
a vertical acceleration calculating portion to calculate a vertical acceleration generated by said vibration generating portion on the basis of said calculated horizontal acceleration and a predetermined acceleration for said vibration generating portion, and
a changing portion to change a scalar of said calculated gravity direction acceleration in such a manner that, when a value resulting from subtracting a scalar of said vertical acceleration from the scalar of said calculated gravity direction acceleration is not greater than a predetermined threshold value, the scalar of said calculated gravity direction acceleration is changed to a value that is derived by adding the scalar of said vertical acceleration to the scalar of said calculated gravity direction acceleration, and when the value resulting from subtracting the scalar of said vertical acceleration from the scalar of said calculated gravity direction acceleration is greater than the predetermined threshold value, the scalar of said calculated gravity direction acceleration is changed to a value that is derived by subtracting the scalar of said vertical acceleration from the scalar of said calculated gravity direction acceleration, and
said counting portion includes a cycle detecting portion to detect a vibration cycle of said gravity direction acceleration of which the scalar has been changed, and
a cancel portion to cancel counting of the number of said instances within said detected vibration cycle after the number of said instances is once counted.

4. The mobile device according to claim 1, wherein said gravity direction detecting portion includes
an average acceleration calculating portion to calculate averages of accelerations in a plurality of predetermined directions, respectively, for a predetermined period on the basis of said detected accelerations in the three directions, and
a determining portion to determine a direction among said predetermined directions in which said calculated average acceleration takes a value closest to the gravitational acceleration to be a gravity direction.

5. The mobile device according to claim 1, further comprising a vibration generating portion to generate vibration by vibration control, wherein when said vibration generating portion is generating the vibration by the vibration control, said step counting portion corrects the gravity direction acceleration calculated by said gravity direction acceleration calculating portion with an acceleration generated by said vibration, to count the number of steps.

6. A mobile device comprising:

three acceleration detecting portions to detect accelerations in three directions, respectively, the three directions being different from each other;

an acceleration calculating portion to calculate averages of accelerations in a plurality of predetermined directions, respectively, for a predetermined period on the basis of said detected accelerations in the three directions; and a determining portion to determine a direction among said predetermined directions in which said calculated average acceleration takes a value closest to the gravitational acceleration to be a gravity direction.

7. A mobile device comprising:

an acceleration detecting portion to detect an acceleration;

a gravity direction detecting portion to detect a gravity direction on the basis of said detected acceleration;

a gravity direction acceleration calculating portion to calculate an acceleration in said detected gravity direction on the basis of said detected acceleration;

a vibration generating portion to generate vibration by rotating about a predetermined rotational axis; and a step counting portion to count the number of steps on the basis of said calculated gravity direction acceleration, wherein said step counting portion includes a correcting portion to correct said calculated gravity direction acceleration with an acceleration generated by said vibration generating portion while said vibration generating portion is rotating, and a counting portion to count the number of instances where said corrected acceleration takes a value of not smaller than a threshold value or the number of instances where said corrected acceleration takes a value of not greater than a threshold value.

8. The mobile device according to claim 7, further comprising a vibration generating portion to generate vibration by vibration control, wherein when said vibration generating portion is generating the vibration by the vibration control, said step counting portion corrects the gravity direction acceleration calculated by said gravity direction acceleration calculating portion with an acceleration generated by said vibration, to count the number of steps.

9. A step counting method comprising the steps of:

detecting accelerations in three directions different from each other;

detecting a gravity direction on the basis of said detected accelerations in the three directions;

calculating an acceleration in said detected gravity direction on the basis of said detected accelerations in the three directions;

counting the number of steps on the basis of said calculated gravity direction acceleration; and generating a vibration by rotating a vibration generating portion about a predetermined rotational axis and while said vibration generating portion is rotating, correcting said calculated gravity direction acceleration with an acceleration generated by said vibration generating portion, and counting the number of instances where said corrected acceleration takes a value of not smaller than a threshold value or the number of instances where said corrected acceleration takes a value of not greater than a threshold value.

10. The step counting method according to claim 9, wherein said correcting step includes the steps of calculating a horizontal acceleration in a direction perpendicular to said gravity direction and perpendicular to said rotational axis on the basis of said detected accelerations in the three directions, calculating a vertical acceleration generated by said vibration generating portion on the basis of said calculated horizontal acceleration and a predetermined acceleration for said vibration generating portion, and changing a scalar of said calculated gravity direction acceleration to a value that is derived by subtracting a scalar of said vertical acceleration from the scalar of said calculated gravity direction acceleration, and said counting step includes the step of canceling counting of the number of said instances within a predetermined period after the number of said instances is once counted.

11. The step counting method according to claim 9, wherein said correcting step includes the steps of calculating a horizontal acceleration in a direction perpendicular to said gravity direction and perpendicular to said rotational axis on the basis of said detected accelerations in the three directions, calculating a vertical acceleration generated by said vibration generating portion on the basis of said calculated horizontal acceleration and a predetermined acceleration for said vibration generating portion, and changing a scalar of said calculated gravity direction acceleration in such a manner that, when a value resulting from subtracting a scalar of said vertical acceleration from the scalar of said calculated gravity direction acceleration is not greater than a predetermined threshold value, the scalar of said calculated gravity direction acceleration is changed to a value that is derived by adding the scalar of said vertical acceleration to the scalar of said calculated gravity direction acceleration, and when the value resulting from subtracting the scalar of said vertical acceleration from the scalar of said calculated gravity direction acceleration is greater than the predetermined threshold value, the scalar of said calculated gravity direction acceleration is changed to a value that is derived by subtracting the scalar of said vertical acceleration from the scalar of said calculated gravity direction acceleration, and said counting step includes the steps of detecting a vibration cycle of said gravity direction acceleration of which the scalar has been changed, and canceling counting of the number of said instances within said detected vibration cycle after the number of said instances is once counted.

12. The step counting method according to claim 9, wherein said step of detecting a gravity direction includes the steps of calculating averages of accelerations in a plurality of predetermined directions, respectively, for a predetermined period on the basis of said detected accelerations in the three directions, and determining a direction among said predetermined directions in which said calculated average acceleration takes a value closest to the gravitational acceleration to be a gravity direction.

13. The step counting method according to claim 9, wherein said step counting method is performed by a mobile device provided with a vibration generating portion which generates vibration by vibration control, and said step of counting the number of steps includes the step of, when said vibration generating portion is generating the vibration by the vibration control, correcting the gravity direction acceleration which has been calculated in said step of calculating an acceleration in said gravity direction with an acceleration generated by said vibration, to count the number of steps.

14. A gravity direction detecting method comprising the steps of:

detecting accelerations in three directions different from each other;

calculating averages of accelerations in a plurality of predetermined directions, respectively, for a predetermined period on the basis of said detected accelerations in the three directions; and determining a direction among said predetermined directions in which said calculated average acceleration takes a value closest to the gravitational acceleration to be a gravity direction.

* * * * *